United States Patent
Sinder et al.

(10) Patent No.: US 12,128,614 B2
(45) Date of Patent: Oct. 29, 2024

(54) ADDITIVE MANUFACTURING SYSTEM COMPRISING A PLURALITY OF MANUFACTURING STATIONS AND METHOD FOR ADDITIVELY MANUFACTURING A PLURALITY OF WORK PIECES

(71) Applicant: TE Connectivity Germany GmbH, Bensheim (DE)

(72) Inventors: Josef Sinder, Woert (DE); Kerstin Brenner, Woert (DE); Daniel Naumov, Woert (DE)

(73) Assignee: TE Connectivity Germany GmbH, Bensheim (DE)

( * ) Notice: Subject to any disclaimer, the term of this patent is extended or adjusted under 35 U.S.C. 154(b) by 0 days.

(21) Appl. No.: 17/673,354

(22) Filed: Feb. 16, 2022

(65) Prior Publication Data
US 2022/0258418 A1 Aug. 18, 2022

(30) Foreign Application Priority Data
Feb. 17, 2021 (DE) .......................... 102021103739.5

(51) Int. Cl.
*B29C 64/182* (2017.01)
*B29C 64/214* (2017.01)
(Continued)

(52) U.S. Cl.
CPC .......... *B29C 64/182* (2017.08); *B29C 64/214* (2017.08); *B29C 64/241* (2017.08); *B29C 64/245* (2017.08); *B29C 64/268* (2017.08); *B29C 64/286* (2017.08); *B33Y 10/00* (2014.12); *B33Y 30/00* (2014.12)

(58) Field of Classification Search
CPC ... B29C 64/182; B29C 64/214; B29C 64/245; B29C 64/241; B29C 64/286; B29C 64/268
See application file for complete search history.

(56) References Cited

U.S. PATENT DOCUMENTS

| 5,985,204 A | 11/1999 | Otsuka et al. |
| 7,665,979 B2 | 2/2010 | Heugel |

(Continued)

FOREIGN PATENT DOCUMENTS

| CN | 105307840 A | 2/2016 |
| CN | 108290219 A | 7/2018 |

(Continued)

OTHER PUBLICATIONS

Japanese Office Action and English translation, dated Jan. 4, 2023, corresponding to Application No. 2022-020117, 11 pages.

(Continued)

*Primary Examiner* — Alison L Hindenlang
*Assistant Examiner* — Erica Hartsell Funk
(74) *Attorney, Agent, or Firm* — Barley Snyder

(57) ABSTRACT

An additive manufacturing system includes a plurality of manufacturing stations each performing a manufacturing step, a laser beam coupling device receiving a laser beam as an input beam, and a plurality of beam paths along which a light of the input beam is guided. The beam paths are directed from the laser beam coupling device to the manufacturing stations.

15 Claims, 1 Drawing Sheet

(51) Int. Cl.
    *B29C 64/241*     (2017.01)
    *B29C 64/245*     (2017.01)
    *B29C 64/268*     (2017.01)
    *B29C 64/286*     (2017.01)
    *B33Y 10/00*     (2015.01)
    *B33Y 30/00*     (2015.01)

(56) References Cited

U.S. PATENT DOCUMENTS

| | | | |
|---|---|---|---|
| 10,183,329 | B2 | 1/2019 | Gunther |
| 10,933,468 | B2 | 3/2021 | Jones et al. |
| 2002/0164069 | A1 | 11/2002 | Nagano et al. |
| 2005/0263932 | A1 | 12/2005 | Heugel |
| 2006/0108712 | A1 | 5/2006 | Mattes |
| 2015/0024233 | A1 | 1/2015 | Gunther |
| 2018/0178449 | A1 | 6/2018 | Cheverton et al. |
| 2018/0200963 | A1 | 7/2018 | Bogdan, Jr. et al. |
| 2018/0326485 | A1* | 11/2018 | Brown .................. B29C 64/135 |
| 2019/0001560 | A1* | 1/2019 | Walrand ............... B23K 26/342 |
| 2019/0232560 | A1 | 8/2019 | Thompson |
| 2020/0290275 | A1 | 9/2020 | Dubelman et al. |
| 2020/0306880 | A1 | 10/2020 | Vorontsov et al. |
| 2021/0213674 | A1 | 7/2021 | Costabeber |

FOREIGN PATENT DOCUMENTS

| | | |
|---|---|---|
| DE | 10235427 A1 | 2/2004 |
| DE | 112019002519 T5 | 6/2021 |
| EP | 3626428 A1 | 3/2020 |
| EP | 3659727 A1 | 6/2020 |
| JP | H115254 A | 1/1999 |
| JP | 2002316363 A | 10/2002 |
| JP | 2005534543 A | 11/2005 |
| JP | 2006500241 A | 1/2006 |
| JP | 2019504182 A | 2/2019 |
| JP | 3224277 U | 1/2020 |
| KR | 100236566 B1 | 1/1999 |
| WO | 2004014636 A1 | 2/2004 |
| WO | 2017085470 A1 | 5/2017 |
| WO | 2018111240 A1 | 6/2018 |

OTHER PUBLICATIONS

German Office Action, App No. 10 2021 103 739.5, dated Oct. 19, 2021, 6 pages.

Chinese First Office Action dated Jul. 28, 2023 with English translation, corresponding to Application No. 202210136553.4, 21 pages.

* cited by examiner

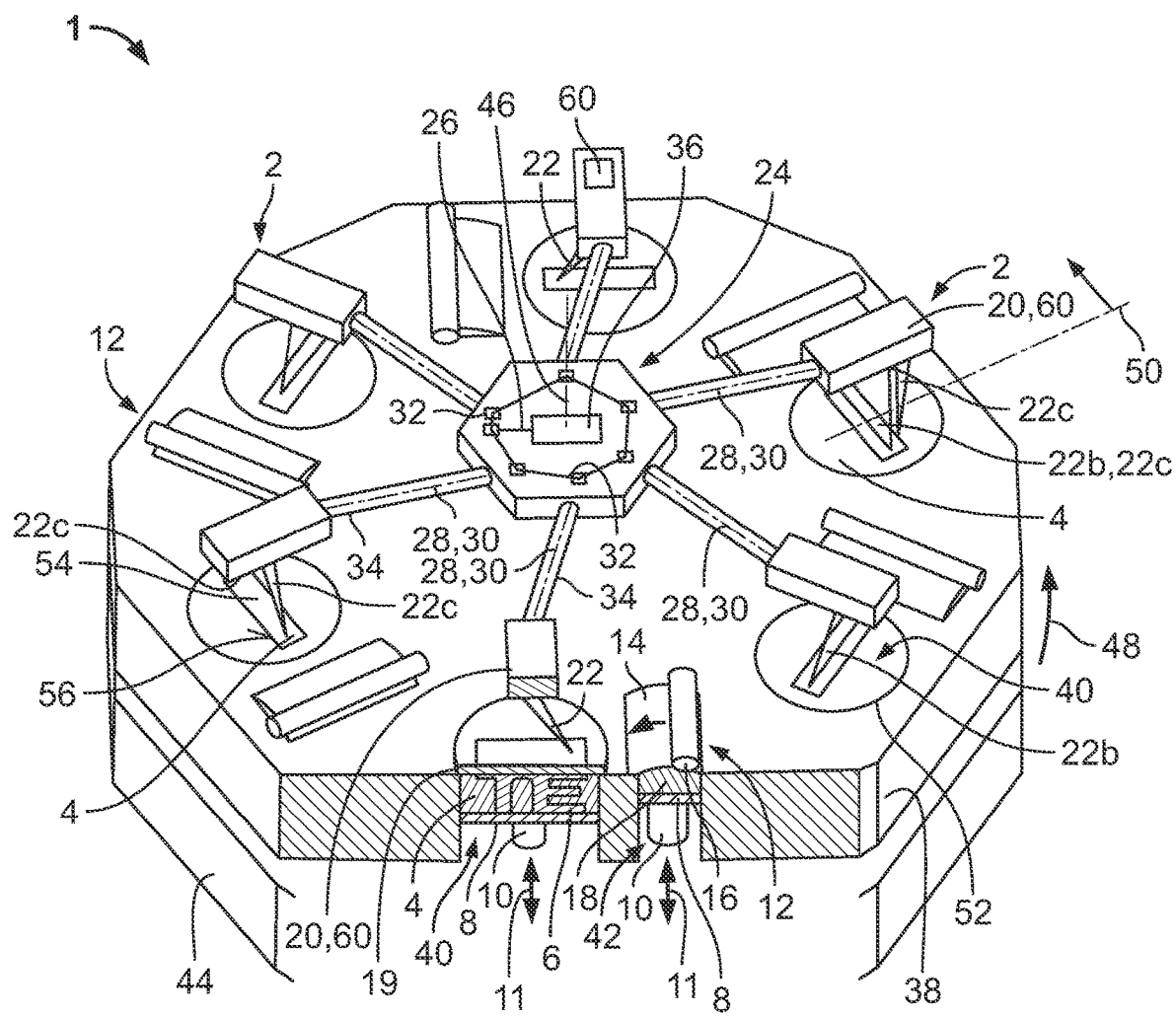

ADDITIVE MANUFACTURING SYSTEM COMPRISING A PLURALITY OF MANUFACTURING STATIONS AND METHOD FOR ADDITIVELY MANUFACTURING A PLURALITY OF WORK PIECES

CROSS-REFERENCE TO RELATED APPLICATIONS

This application claims the benefit of the filing date under 35 U.S.C. § 119(a)-(d) of German Patent Application No. 102021103739.5, filed on Feb. 17, 2021.

FIELD OF THE INVENTION

The invention relates to a manufacturing system and, more particularly, to an additive manufacturing system.

BACKGROUND

Additive manufacturing systems are known. A three-dimensional work piece is created in the context of additive manufacturing by applying a material layer by layer. Plastic materials, synthetic resins, ceramics, metals as well as carbon and graphite materials can be used as materials. Some additive manufacturing methods, such as laser sintering, laser beam melting, or laser deposition welding, are based on the use of laser light.

SUMMARY

An additive manufacturing system includes a plurality of manufacturing stations each performing a manufacturing step, a laser beam coupling device receiving a laser beam as an input beam, and a plurality of beam paths along which a light of the input beam is guided. The beam paths are directed from the laser beam coupling device to the manufacturing stations.

BRIEF DESCRIPTION OF THE DRAWINGS

The invention will now be described by way of example with reference to the accompanying FIGURES, of which:

FIG. 1 is a sectional perspective view of an additive manufacturing system according to an embodiment.

DETAILED DESCRIPTION OF THE EMBODIMENT(S)

Embodiments of the invention will be described in greater detail below. Individual features of a configuration can be omitted if the technical effect associated with this feature is not crucial for a specific application. Conversely, individual features can also be added to the embodiment should the technical effect of these features be advantageous for a specific application. The features described below can be used both in a method and in a device regardless of the context in which they are described. For example, in the case of a method feature, the device is configured to carry out this method feature.

An additive manufacturing system 1 can comprise a plurality of manufacturing stations 2, as shown in FIG. 1, presently only six by way of example. The number of manufacturing stations 2 is arbitrary, but can be between four and twelve, or more particularly between six and eight. Manufacturing stations 2 of manufacturing system 1 can be configured identically or differently.

A manufacturing station 2 can comprise a construction chamber 4 in which a work piece 6 is manufactured. The construction chamber 4 can be seen clearly in the partial section in the foreground in FIG. 1. Construction chamber 4 can comprise a lifting base 8 which can be lowered or raised by way of a lifting base drive 10, as indicated by arrow 11. The construction chambers 4 of the manufacturing stations 2 can be spaced from one another.

A manufacturing station 2 can also comprise a material supply device 12. Material supply device 12 is configured to supply a material 14 required for building up work piece 6, for example, a powder and/or a liquid, to construction chamber 4. A wiper 16 can be provided for supplying powder. Material supply device 12, in an embodiment, comprises a material reservoir 18 in which material 14 is received.

Like construction chamber 4, material supply device 12 can also have a lifting base 8 with a lifting base drive 10. By raising lifting base 8 of material reservoir 18, for example, new material 14 can always be supplied to wiper 16 in the form of a material layer 19 which is then applied, layered, or heaped by wiper 16 in construction chamber 4 while lifting base 8 is lowered in construction chamber 4 so that new material layer 19 always remains at the same height.

A material supply device 12 can be arranged between two adjacent construction chambers 4. Material supply device 12 can be configured to supply material 14 to only one or to both adjacent construction chambers 4. Two adjacent manufacturing stations 2 can share at least one common material supply device 12 so that fewer material supply devices than manufacturing stations 2 are required. The manufacturing system 2 can furthermore comprise an alternating arrangement of construction chambers 4 and material supply devices 12, in particular in the direction of motion of the construction chambers 4 and/or scan devices 20.

The manufacturing station 2, as shown in FIG. 1, can also comprise a scan device 20, for example, in the form of a scan head, by way of which at least one laser beam 22, hereinafter referred to as a manufacturing beam, is guided to construction chamber 4. Scan device 20 is configured to direct manufacturing beam 22 to different positions relative to construction chamber 4. Where manufacturing beam 22 impinges material 14, material 14 is melted (powder) or solidified (liquid), depending on its nature, and work piece 6 is built up in this manner. Each manufacturing station 2 has at least one scan device 20. At least one scan device 20 is associated with each construction chamber 4.

Scan device 20 comprises optical elements, for example, reflective, diffractive, and/or refractive elements such as prisms, filters, lenses, or mirrors. Individual optical elements can be movable, in particular driven by a motor. The reflective, diffractive, and/or refractive elements are used for beam deflection and/or beam shaping. Scan device 20 is configured, in particular, to change at least one beam parameter of manufacturing beam 22 from the group of energy density, beam geometry, in particular the cross-sectional shape of the manufacturing beam, direction and wavelength of the laser light.

Lifting base 10 enables changing a distance between a scan device 20 and the work piece 6 being processed by scan device 20 by raising and/or lowering. As an alternative thereto, scan device 20 can also comprise variably focusing optical elements, such as, for example, lenses. The variable distance between the work piece 6 and the scan device 20 and/or the variable focus allows the outer skin of the work piece 6 or its surface to be processed more precisely.

Manufacturing beam 22 can have, for example, a point-shaped, circular, or elliptical or, as shown by way of example at reference character 22*b* in FIG. 1, an at least approximately linear beam cross section. The linear shape of the beam cross section can be curved or straight and, for example, correspond at least in sections to a contour of work piece 6 to be manufactured. The line shape can coincide at least in sections with a contour, for example, an outer or inner contour of the work piece 6 so that the respective contour is created in one step where the manufacturing beam 22 impinges the material 14.

A scan device 20 can also direct two or more manufacturing beams 22 to construction chamber 4 at the same time, as indicated by reference character 22*c*. For example, one manufacturing beam 22*c* can be point-shaped and another manufacturing beam 22*c* can be linear. In principle, two manufacturing beams 22*c* can have the same or different beam parameters.

This enables the work piece 6 to be manufactured with two or more laser beams at the same time. Each of the manufacturing beams 22 can be formed by a different partial beam 28 or by the same partial beam 28. For example, a manufacturing beam 22 with a smaller beam cross section can be used to manufacture an outer skin of the work piece 6, while at the same time a manufacturing beam 22 with a larger beam cross section is used to manufacture a filling between the outer skin. This makes it possible to manufacture the outer skin of a work piece 6 with great accuracy, while work can be carried out inside the work piece 6 at a high manufacturing speed. In this way, there is no need to rework the outer skin.

Additive manufacturing system 1 also comprises a laser beam coupling device 24. At least one laser beam 26, hereafter referred to as the input beam, is coupled into manufacturing system 1 at laser beam coupling device 24 and split into partial beams 28 which are directed simultaneously from laser beam coupling device 24 to manufacturing stations 2, in particular to scan devices 20. Partial beams 28 run along beam paths 30. Beam paths 30 can be determined with the aid of the geometric optics based on the structure of manufacturing system 1, in particular based on the arrangement and orientation of optical elements of manufacturing system 1.

Beam paths 30 extend from laser beam coupling device 24 to scan devices 20 and from scan devices 20 into or, synonymously, to construction chambers 4. Beam paths 30 can be further split in scan devices 20. For example, a beam path 30 reaching from laser beam coupling device 24 into scan device 20 can be split into further beam paths along which corresponding manufacturing beams 22*c* then extend. The partial beams 28 and/or the beam paths 30 extend to at least a subset of the manufacturing stations 2, and in an embodiment to all manufacturing stations 2.

To split input beam 26 into partial beams 28, laser beam coupling device 24 comprises one or more beam splitters 32 at which one or more partial beams 28 are coupled out from input beam 26. A beam splitter 32 is an optical element such as a partially transparent mirror or a prism.

Beam paths 30, along which partial beams 28 propagate during the operation of manufacturing system 1 in the region between laser beam coupling device 24 and manufacturing stations 2, are predetermined by the configuration of laser beam coupling device 24. For example, the type, orientation, and arrangement of the optical elements in the beam path 30, for example, the type, orientation, and arrangement of beam splitters 32 as well as of any other reflective, diffractive, and/or refractive elements such as mirrors, partially transparent mirrors, filters, prisms, fiber optics, and lenses, determine the direction and the beam parameters of a partial beam 28. It is possible for more than one laser beam to extend along one beam path 30. The number of partial beams 28 or beam paths 30 corresponds at least to the number of manufacturing stations 2.

For conceptual differentiation, those laser beams that impinge the work piece 6 or are used directly to manufacture the work piece 6 are referred to hereafter as manufacturing beams. In contrast, as already mentioned, the laser beam is referred to as the input beam before it is split into partial beams 28.

Between a scan device 20 and associated construction chamber 4, the beam path 30 and the beam parameters of a manufacturing beam 22 are predetermined by the type, arrangement, and orientation of the optical elements of respective scan device 20. Manufacturing stations 2 are, in an embodiment, arranged around laser beam coupling device 24. Beam paths 30 of partial beams 28 extend radially or spoke-like from laser beam coupling device 24 to manufacturing stations 2 or their scan device 20, respectively. More than one partial beam 28 or a beam path 30, respectively, can lead to a manufacturing station 2 or a scan device 20, respectively. Scan devices 20 can be arranged, for example, as shown in FIG. 1, equidistantly and equigonally, i.e. at the same angular distances around laser beam coupling device 24. At the point at which the partial beams 28 emerge from the laser beam coupling device 24, the partial beams 28 can be spaced from one another. They can also be disposed in the same plane or in different planes.

Partial beams 28 can be guided from laser beam coupling device 24 in an optical waveguide 34 to respective scan device 20, as shown in FIG. 1.

Additive manufacturing system 1 can comprise one or more lasers 36 for generating one or more input beams 26. Laser beam coupling device 24 can be configured to split at least one input beam 26 into partial beams 28. At least one input beam 26 is coupled into laser beam coupling device 24.

Construction chambers 4 and/or material supply devices 12 can be part of a manufacturing table 38, as shown in FIG. 1. For example, a construction chamber 4 can be formed by a recess 40, for example, a passage opening or a slot, of manufacturing table 38 or extend at least in part in a passage opening or a slot or be disposed therein. Alternatively or additionally, a material reservoir 18 can be formed by a recess 42, for example, likewise in the form of a passage opening or a slot of manufacturing table 38.

Manufacturing table 38 can be driven as a rotary table to rotate intermittently or continuously about an, in particular, vertical axis of rotation 46 relative to a machine frame 44 of manufacturing system 1. The direction of rotation is indicated by arrow 48. Construction chambers 4 can be arranged to be equidistant from and equigonal about axis of rotation 46. Material supply devices 12 can also be arranged independently thereof to be equigonal and equidistant from axis of rotation 46, in particular, at the same distance from axis of rotation 46 as material supply devices 12. Finally, scan devices 20 can also be arranged independent thereof to be equigonal and equidistant from axis of rotation 46.

Individual or all scan devices 20 can be arranged in a stationary manner relative to manufacturing table 38. In this embodiment, the relative position during rotational motion 48 between a scan device 20 and construction chamber 4 associated therewith and processed thereby remains unchanged during rotational motion 48. This configuration is suitable, for example, for the manufacture of at least one work piece 6 to be started in a construction chamber 4 by scan device 20 associated therewith once this construction chamber 4 passes through an, in particular, stationary angular position 50. During further rotational motion 48 of this construction chamber 4, work piece 6 is then built up until it is completed before reaching angular position 50 and is removed from construction chamber 4, for example, by a robot or manually. Angular position 50 accordingly forms a delivery station at which the finished work pieces are removed from manufacturing system 1 and, if necessary, construction chambers 4 are emptied and/or cleaned in an automated manner, in an embodiment, for the manufacture of next work piece 6. Angular position 50 can be fixed at any point and in particular also be variable during the operation of manufacturing system 1.

Subsequently, after passing angular position 50, the construction of the next at least one work piece 6 begins. This process takes place at each manufacturing station 2 so that, when manufacturing system 1 is in operation, at least one work piece 6 is at a different degree of completion in each construction chamber 4.

The finished work pieces 6 do not have to be identical. Different work pieces 6 can also be manufactured in the course of rotational motion 48, where different work pieces 6 differ in at least one work piece parameter from the group of material, geometry, and topology. Large work pieces 6 that require a longer manufacturing time can remain in their construction chamber 4, for example, for more than one complete revolution of manufacturing table 38 so that, starting out from angular position 50, they are only completed and can be removed after two or more revolutions. Smaller work pieces 6 with a correspondingly shorter manufacturing time can be completed before angular position 50 has been reached and then remain in the construction chamber; or the production process is only started after a certain time behind angular position 50, so that these work pieces 6 are completed when angular position 50 has been reached. The same production steps or different production steps for the manufacture of the same or of different work pieces 6 can be carried out simultaneously, in particular by the plurality of the manufacturing stations 2.

A manufacturing station 2 can be used to produce several, identical or different, work pieces 6 at the same time, provided that a plurality of work pieces 6 fit into a construction chamber 4.

The laser beam coupling device 24 can be located at the center of the manufacturing table 38. The manufacturing stations 2 can be evenly distributed in the circumferential direction, i.e. be equigonal, and arranged at the same distance around the axis of rotation 46. The scan devices 2 are arranged above the manufacturing table 38, in particular above the construction chambers 4, where the presence of a manufacturing table 38 is not important if the construction chambers 4 are arranged above the rotary table 38.

If, with manufacturing table 38 rotatable relative to machine frame 44, scan devices 20 and construction chambers 4 have an association that is temporally invariable, for example, by being configured or fixed to be stationary relative to one another, it is advantageous to have laser beam coupling device 24 likewise be arranged stationary relative to scan devices 20, i.e. likewise co-rotate with manufacturing table 38. At least one laser 36 can co-rotate with laser beam coupling device 24. However, if, for example, an input beam 26 is introduced into laser beam coupling device 24 coaxially to axis of rotation 46, then laser 36 generating it can also be arranged in a stationary manner relative to machine frame 44.

In a further embodiment, material supply devices 12 can be movable at least in part, in particular be rotatable relative to construction chambers 4. For example, only wipers 16 can be movable, in particular be rotatable, relative to construction chambers 4.

The construction chambers 4 can be rotatable or stationary relative to material reservoirs 18. For example, construction chambers 4 and material reservoirs 18 can be driven to be movable relative to machine frame 44, in particular be driven to be rotatable about axis of rotation 46, while wipers 16 and scan devices 20 are arranged stationary relative to machine frame 44. Of course, this arrangement can also be kinematically reversed in that construction chambers 4 and material reservoirs 18 are arranged stationary relative to machine frame 44, while scan devices 20 and wipers 16 are driven to be rotatable relative to machine frame 44 about axis of rotation 46.

In these configurations, a material layer 19 is applied in the course of rotational motion 48 in an automated manner in a construction chamber 4 when construction chamber 4 passes a wiper 16. The construction of work piece 6 in construction chamber 4 by scan device 20 following a wiper 16 in the direction of the rotational motion can already be commenced in the course of rotational motion 48 while material layer 19 is still being applied. This is possible, for example, if construction chamber 4 is larger in the direction of rotational motion 48 than the distance between a wiper 16 and scan device 20 or a production region 52 downstream in the direction of rotational motion 48 that is passed over by a manufacturing beam 22 emanating from scan device 20 and which can correspond to base area 52 of a construction chamber 4.

In the course of rotational motion 48, a material layer 19 is therefore applied in the construction chamber by each material supply device 2 and the newly applied layer is built up on work piece 6 by manufacturing station 2 immediately following the respective material supply in the direction of rotational motion 48. The alternating application and construction takes place cyclically in the course of a continuous or intermittent rotational motion until at least one work piece 6 has been completed.

The work piece 6 with the material layer 19 that has just been applied can be built up by the scan device 20 while the material layer 19 has not yet been completely applied or the material layer 19 is still being applied simultaneously. Such simultaneous application of the material layer 19 and its build-up on the work piece 6 is possible in particular if a dimension of the construction chamber 4 in the direction of the relative motion is greater than the distance between the wiper 16 and the scan device 20 or a manufacturing region, respectively, that is swept over by a manufacturing beam 22 emanating from the scan device 20.

As already mentioned above, a scan device 20 is configured to direct at least one manufacturing beam 26 into construction chamber 4 for creating work piece 6. One manufacturing beam 22c can have, for example, a larger beam diameter than another manufacturing beam 22 which is used in construction chamber 4 at the same time. Manufacturing beam 22c with a larger diameter is advantageously used to produce a filling 54 of work piece, which is located within an outer skin 56 of work piece. Outer skin 56 is, in an embodiment, manufactured by manufacturing beam 22c having a smaller beam cross section.

Manufacturing table 38 does not need to be rotatable. It can also be stationary relative to machine frame 44. It must then be ensured that the finished work pieces 6 can be removed from the different positions at which construction chambers 4 of individual manufacturing stations 2 are located when they are finished.

It can also be advantageous to have the construction chambers 4 and the scan devices 20 be arranged in a stationary manner relative to one another. In such a configuration, the association between the construction chambers 4 and the scan devices 20 can be temporally invariable. Such a configuration can be useful if a scan device 20 is configured to manufacture the entire work piece 6.

Regardless of whether manufacturing table 38 can be rotated relative to machine frame 44, the temporal association of scan devices 20 with construction chambers 4 can also be variable. This is the case, for example, when scan devices 20 and construction chambers 4 are arranged to be movable relative to one another, in particular so as to be rotatable relative to one another. In this case, it is useful for laser beam coupling device 24 to be stationary relative to scan devices 20. For example, scan devices 20 can then rotate together with laser beam coupling device 24 about axis of rotation 46 relative to construction chambers 4 and machine frame 44. Alternatively, scan devices 20 and laser beam coupling device 24 can be arranged in a stationary manner relative to machine frame 44 and manufacturing table 38 can be driven to be rotatable about axis of rotation 46 relative to machine frame 44 and thereby also relative to scan devices 2.

According to a further embodiment, the manufacturing system 1 can be configured to be operable in a first and a second operating mode. The manufacturing system 1 can be configured to be switchable between the first and the second operating mode. In the first operating mode, there can then be a temporally variable association between construction chambers 4 and scan devices 20, for example, in that the construction chambers 4 and the scan devices 20 are movable relative to one another, in particular are driven to be movable. In the second operating mode, the association between the construction chambers 4 and the scan devices 20 can be temporally invariable, at least during the manufacture of the work pieces 6 disposed in the construction chambers 4, i.e., construction chambers 4 and scan devices 20 can be immovable relative to one another.

In both configurations, scan devices 20 migrate from one construction chamber 4 to the other construction chamber 4 in the course of the motion relative to manufacturing table 38. Such a configuration is useful if one or individual scan devices 20 are specially configured for a specific production step, for example, for the reason that a production beam 22 with a certain beam cross section, a certain energy density, and/or a certain shape or wavelength is required for a certain production step which can only be generated by a specific scan device 20. In this embodiment, the production step is carried out when scan device 20 configured for this purpose is disposed above construction chamber 4 or is moved above construction chamber 4.

The configurations described above can also be combined. For example, manufacturing table 38 can be movable, in particular rotatable, relative to machine frame 44. In addition, the plurality of scan devices 2 can be rotatable relative to machine frame 44 and relative to manufacturing table 38.

A measuring device 60, which is configured to detect at least some dimensions of a finished work piece 6 or a work piece 6 that is in production, can be integrated into one, individual, or all of scan devices 2. Measuring device 60 can use, for example, a manufacturing beam 22 as a measuring beam for measuring. The energy density and the beam cross section of the measuring beam can be reduced compared to manufacturing beam 22 in that optical elements, for example, a filter or a beam splitter, are pivoted into beam path 30 in scan device 20 in a measuring mode of manufacturing system 1. For example, the measuring beam can be grid-shaped. In a manufacturing mode of manufacturing system 1, the energy density could then be increased again so that a manufacturing beam 22 is present. The manufacturing system is configured to be switchable between the measuring mode and the manufacturing mode. Switching from the manufacturing mode to the measuring mode can be done, for example, by switching over optical elements in the scan device 20. For example, filters and/or beam splitters can be pivoted into the beam path in order to reduce the energy density of the manufacturing beam 22 in the measuring mode compared to the manufacturing mode. The measuring device 60 is, in an embodiment, an optical measuring device and comprises an optical sensor.

The additive manufacturing system 1 according to the above embodiments permits manufacture of a large number of work pieces quickly and inexpensively by way of additive manufacturing with the aid of laser light.

What is claimed is:

1. An additive manufacturing system, comprising:
a plurality of manufacturing stations each performing a manufacturing step, the manufacturing stations each have a construction chamber;
a laser beam coupling device receiving a laser beam as an input beam;
a plurality of beam paths along which a light of the input beam is guided, the beam paths are simultaneously directed from the laser beam coupling device to the manufacturing stations;
a plurality of material supply devices each having a material reservoir holding a material and a lifting base moving the material; and
a plurality of material wipers, the material wipers are stationary, the material supply devices and the construction chambers are rotatable about an axis of rotation, the lifting bases are rotatable with the material supply devices about the axis of rotation and movable along a direction of the axis of rotation, the material wipers apply the material to the construction chamber when the construction chamber passes the material wipers.

2. The additive manufacturing system of claim 1, wherein the manufacturing stations are arranged around the laser beam coupling device.

3. The additive manufacturing system of claim 1, wherein the manufacturing stations each have a scan device deflecting one of the beam paths toward the construction chamber.

4. The additive manufacturing system of claim 3, wherein a pair of beam paths are directed from the scan device to the construction chamber.

5. The additive manufacturing system of claim 4, wherein a pair of laser beams having different diameters extend along the pair of beam paths.

6. The additive manufacturing system of claim 3, wherein the construction chamber and the scan device are movable relative to each other.

7. The additive manufacturing system of claim 3, wherein the construction chamber and the scan device are stationary relative to each other.

8. The additive manufacturing system of claim 1, wherein the material supply devices are part of a manufacturing table.

9. The additive manufacturing system of claim 3, wherein the construction chamber is part of a manufacturing table.

10. The additive manufacturing system of claim 1, wherein at least one of the manufacturing stations generates a manufacturing beam having a linear beam cross section and decoupled from the input beam.

11. The additive manufacturing system of claim 1, further comprising a plurality of optical waveguides between the laser beam coupling device and the manufacturing stations.

12. The additive manufacturing system of claim 11, wherein at least one of the beam paths extends through each of the optical waveguides.

13. The additive manufacturing system of claim 1, further comprising a measuring device measuring a work piece produced by the additive manufacturing system.

14. A method for the additive and simultaneous manufacture of a plurality of work pieces, comprising:
   providing the apparatus of claim 1;
   providing a plurality of scan devices, one for each manufacturing station; and
   splitting a laser beam received by the laser beam coupling device into a plurality of partial beams wherein the partial beams are guided simultaneously along the plurality of beam paths to the plurality of scan devices.

15. The method of claim 14, wherein the material layer is processed by the scan device while it is still being applied.

* * * * *